Jan. 17, 1928.
H. D. WILLIAMS
1,656,506
MACHINE FOR CUTTING GEAR TEETH
Filed July 3, 1923   3 Sheets-Sheet 1
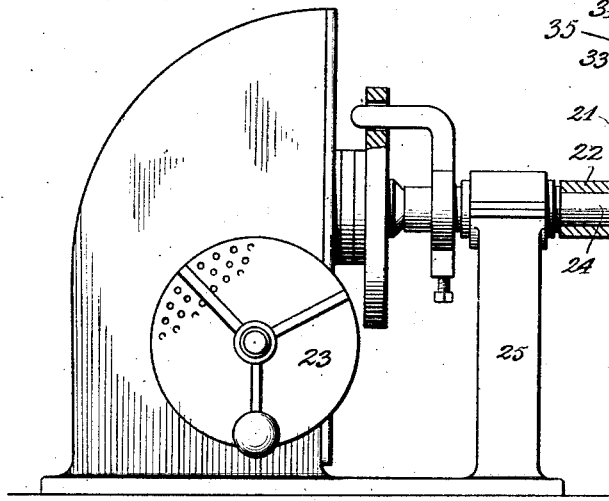
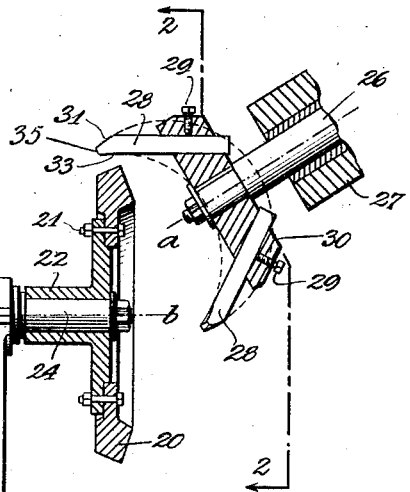
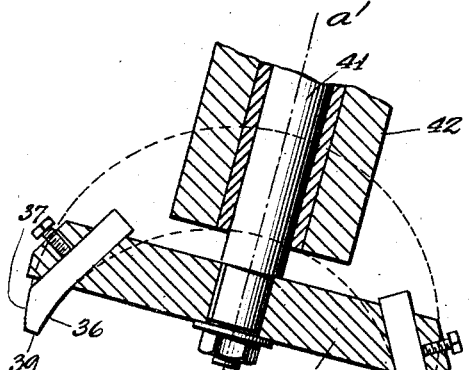
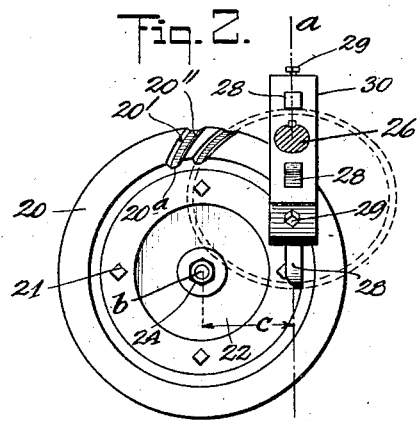
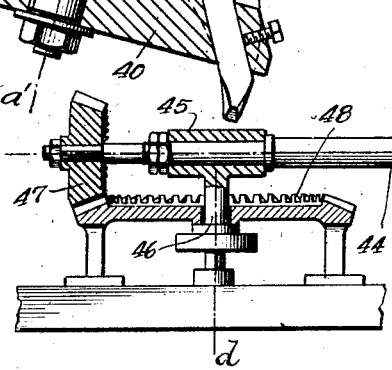
INVENTOR
Harvey D. Williams
BY
Locke, Kehlenbeck & Mathé
ATTORNEYS.

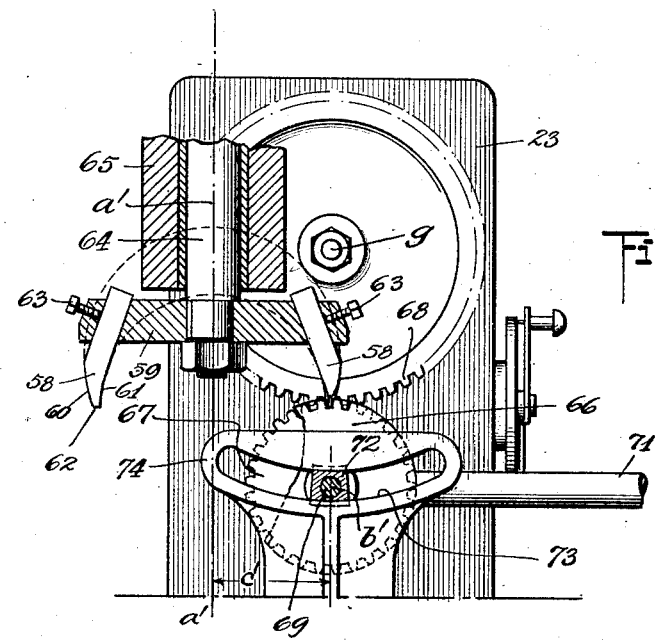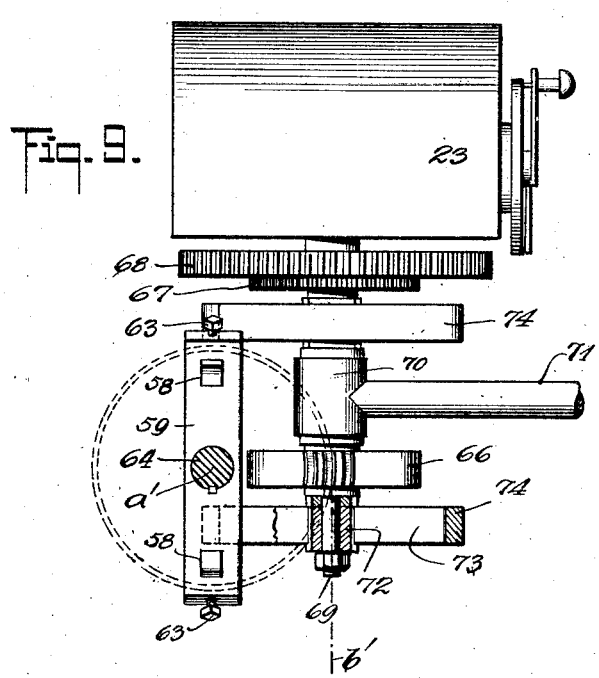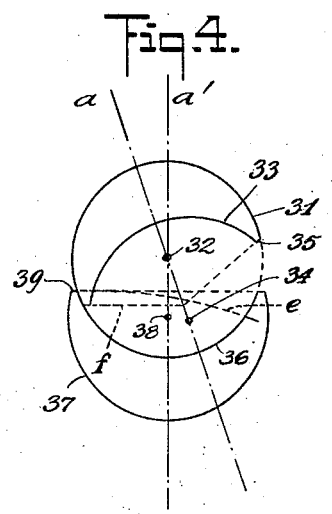

Jan. 17, 1928.  
H. D. WILLIAMS  
1,656,506  
MACHINE FOR CUTTING GEAR TEETH  
Filed July 3, 1923  3 Sheets-Sheet 3
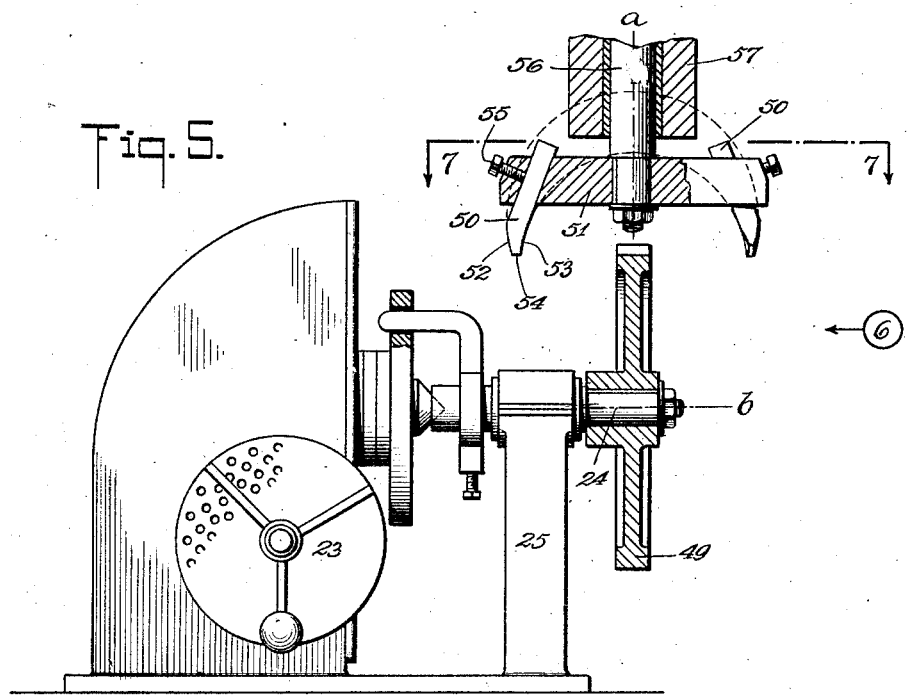
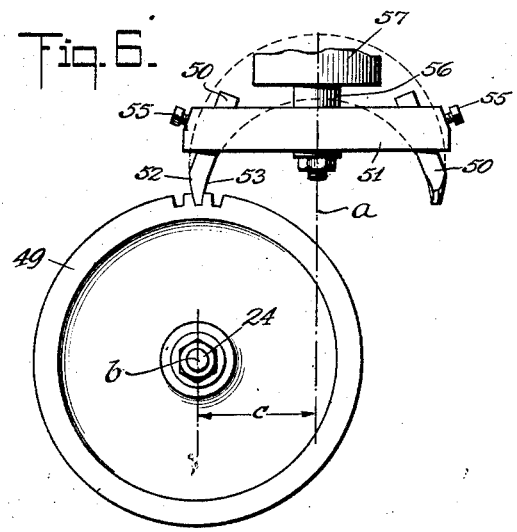
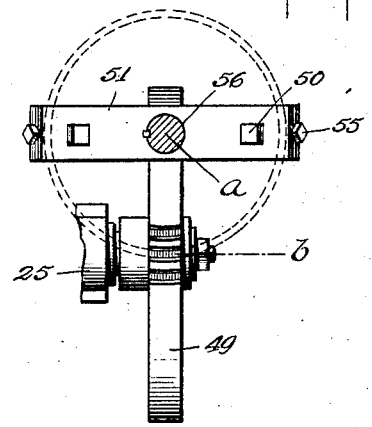
INVENTOR  
*Harvey D. Williams*  
BY  
*Lora, Kehlenbeck & Mathé*  
ATTORNEYS.

Patented Jan. 17, 1928.

1,656,506

UNITED STATES PATENT OFFICE.

HARVEY D. WILLIAMS, OF WALLINGFORD, CONNECTICUT, ASSIGNOR TO SECURITY TRUST COMPANY, OF DETROIT, MICHIGAN, A CORPORATION OF MICHIGAN.

MACHINE FOR CUTTING GEAR TEETH.

Application filed July 3, 1923. Serial No. 649,283.

This invention relates to machines for cutting gear teeth of a novel formation involving curvature in two mutually-intersecting directions, the gears embodying such novel tooth formation being set forth more fully, and claimed, in Letters Patent of the United States No. 1,469,290 granted on an application filed by me on June 11, 1918, Serial No. 239,354, of which the present application is a continuation in part.

The gears to be cut with the aid of machines forming the subject-matter of the present application are of the type in which the two meshing gears are of different kinds, one of such gears (generally the larger one) having its active tooth surfaces conformed to a so-called single-reproduction configuration, that is to say, a shape such as can be described by a simple motion of a suitable tool relatively to a stationary blank, while the other gear (generally the smaller one) has its active tooth surfaces conformed to a compound-reproduction configuration, that is to say, a shape which requires a (rolling) movement of the blank relatively to the tool, in addition to the cutting motion of the tool. The active tooth surfaces of the gear conformed to the single-reproduction configuration are preferably of spherical curvature, according to the invention described and claimed in my said Letters Patent and the successive working surfaces are alternately convex and concave; that is to say, of the two cut surfaces on the same tooth, or of the two active cut surfaces bounding the same tooth-space, one is convex and the other concave. For the sake of simplicity and clearness, the gear having active tooth surfaces of single-reproduction configuration has been referred to herein as the "wheel", and the other gear as the "pinion", without necessarily implying that the latter is the smaller of the two meshing gears. Spur gears as well as bevel gears may be cut with the aid of machines embodying my present invention.

Several examples of machines embodying my present invention are shown in the accompanying drawings, in which Fig. 1 is a side elevation, with parts in section, of a machine for cutting the teeth of a bevel "wheel" according to my invention; Fig. 2 is a partial end elevation thereof, with parts in section on line 2—2 of Fig. 1; Fig. 3 shows in section a machine embodying my invention and adapted for cutting teeth on a bevel "pinion" of a character adapted to mesh with a "wheel" the tooth-surfaces of which have been fashioned with a machine such as illustrated by Figs. 1 and 2; Fig. 4 is a diagrammatic view showing the relation of the "wheel" cutter forming part of the machine shown in Figs. 1 and 2, to the "pinion" cutter forming part of the machine shown in Fig. 3; Fig. 5 is a side elevation of a machine for forming teeth on a spur "wheel" according to my invention, with parts in section; Fig. 6 is an end elevation of the same machine, looking in the direction of the arrow 6 in Fig. 5; Fig. 7 is a partial plan, with parts in section on line 7—7 of Fig. 5; Fig. 8 is an elevation, with parts in section, showing a machine for cutting the tooth-surfaces of spur "pinions" in accordance with this invention; and Fig. 9 is a plan view with parts in section of the machine shown in Fig. 8.

The embodiment illustrated by Figs. 1, 2, and 4 is a machine for cutting the active tooth-surfaces of bevel "wheels" according to my invention. The blank of such wheel is designated as 20 and is shown secured, as by screws 21, to a suitable support 22. In the construction shown, the blank is assumed as normally stationary, but connected with an "indexing" device 23 of any well-known or approved construction, by the aid of which the blank 20 and its support 22 may be given a partial turn about the axis of the shaft 24, journaled in the bearing 25. Thus, after one operation of the cutter, the blank may be "indexed" to bring another portion of the blank into operative relation to the cutter. The latter is mounted to turn about an axis $a$ in skew relation to the axis $b$ of the blank 20 and of the shaft 24 on which the blank support 22 is mounted, it being understood that blank, support, and shaft turn in unison during the indexing operation, but are stationary during the cutting operation. Wherever in this specification or in the appended claims I refer to a skew relation of the axes $a$, $b$ or of similar axes, I intend the word "skew" to be understood in its geometrical sense, according to which two straight lines (in the present case, the axes) are said to be in skew relation to each other when they are neither parallel nor intersecting; or in other words, when such lines or axes do not lie in the same plane. The cutter is shown as mounted on a shaft 26, journaled in a stationary bearing 27, and driven in any suitable manner, for instance by means of a pulley and a belt (not shown).

With respect to the cutter proper, I will refer to my U. S. Patent No. 1,313,034 of August 12, 1919, in which I have described such cutter in detail, and claimed it. A brief explanation of the shape of the cutter will therefore suffice in the present case. The cutter is here shown as comprising a plurality of tips 28, secured, as by screws 29, to a holder 30 which rotates in unison with the shaft 26. The tips 28, or at least their free or cutting ends, are spaced equally in a circumferential direction, that is to say, 180° apart when there are two such cutter tips, as in the construction illustrated. Only the cutter portions near their free ends are active portions, that is to say, only these come in contact with the blank. Each of these cutter portions comprises two edges adapted to cut concave and convex tooth surfaces respectively on the blank. The convex cutter edge 31, which is adapted to cut concave surfaces, such as 20', on the blank 20, is curved according to the arc of a circle the center of which, 32 (see Fig. 4), lies on the axis $a$ about which the cutter turns. The other (concave) edge 33, which cuts the convex tooth surfaces, such as 20'' in Fig. 2, is curved according to the arc of a circle having its center 34 likewise upon said cutter axis $a$. In the diagrammatic showing Fig. 4, the entire cutter has been shown with edges of circular curvature, but obviously it will be sufficient to make only the active free ends of the cutter tips 28 of this shape, as indicated in Figs. 1 and 2; still, for the sake of easier comparison, dotted lines in Fig. 1 indicate the full circular outline of Fig. 4, and a corresponding showing will be found in Figs. 3, 5, 6, and 8. It will be understood that the cutting ends of the tips 28 are at the same distance from the cutter axis $a$, and travel in the same path. The bottom edge 35 of each cutter tip 28 is generally straight, and may be either inclined to the cutter axis as in Figs. 1 and 4, or it might be perpendicular to said axis.

Generally, the radius of the convex arc 31 is made slightly larger than the raduis of the concave arc 33, but I do not desire to restrict myself to this specific relation, and in some cases these two radii might be exactly equal. The cutter axis $a$ will generally be on the "inside" of the gear blank 20, that is to say, the axis $a$ will pass between the axis $b$ and the tooth zone of the blank. In the particular case illustrated by Figs. 1 and 2, the (shortest) distance $c$ between the two axes $a$ and $b$ is approximately equal to the radii of the two cutter arcs 31 and 33. The location of the axis $a$ is determined by rather intricate calculations, which I do not deem it necessary to reproduce here. In the example shown in Figs. 1 and 2, the axis $a$ has been so located that the path of any point of the cutting edge, and consequently the (longitudinal) shape of the teeth, will be a circle approximating the involute of a circle whose center is on the axis $b$ and whose plane is perpendicular to said axis $b$.

When a cutter of the character set forth above is rotated about the axis $a$, its edge 35, and the portions of its edges 31, 33 adjacent to said edge 35, or in other words, located on the "tip" of the cutter, will form on the blank 20 three surfaces of different characteristics; first, a bottom surface $20^a$, produced by the edge 35, and if the latter is inclined to the axis $a$, as in Figs. 1 and 4, said bottom surface $20^a$ will be conical; if however the edge 35 were perpendicular to the axis $a$ (see the corresponding edge 54 in Fig. 5), the bottom surface formed on the tooth-space of the blank 20 would be plane; second, the concave surface 20' referred to above, which is of spherical curvature, cut by the edge 31, said surface being part of a sphere having its center at 32; third, the convex surface 20'', produced by the edge 33, and of spherical curvature, said surface being part of a sphere having its center at 34. The elliptical dotted lines in Fig. 2 (and also the dotted curves in Figs. 7 and 9) illustrates the path of the cutter tip while fashioning the surfaces of one tooth space on the blank. The blank 20 may have the tooth spaces formed preliminarily by casting or by a preparatory cutting operation intended to give the teeth an approximately correct form, in which case the cutter illustrated would be simply a finishing cutter. However, if preferred, the cutter illustrated may be employed to fashion the teeth from a solid blank (having no tooth spaces formed even roughly); in this case it would be desirable to give the cutter a gradual feed lengthwise of the axis $a$ until the proper depth of cut is attained; such axial feed movement might even be employed when the cutter is used simply as a finishing cutter. As mechanisms for effecting such axial feed of the cutter are well-known in the art, I have not deemed it necessary to show them.

It will be understood that after the surfaces of one tooth space have been fashioned as described by rotating the cutter while the blank 20 is stationary, the blank will be brought to a new position relatively to the cutter, or "indexed," by giving the blank the requisite angular movement or partial rotation about its axis $b$, or, if preferred, effecting a corresponding shift of the cutter axis $a$ around the blank axis $b$. The "indexing" mechanism indicated at 23 in Fig. 1 and of any suitable construction, may be used for this purpose. Fig. 2 shows two adjoining tooth spaces having their surfaces fashioned by the cutter in two successive indexed positions.

The working tooth-surfaces of the bevel "pinion" which is to mesh with a "wheel" of the kind set forth above, are produced by a rotary (or oscillating) cutter of the same general character as the "wheel"-cutter. Instead of having the blank stationary relatively to the cutter-axis (as in the case of the "wheel") during the cutting of a pair of tooth-surfaces (one convex and the other concave), I effect a relative rolling motion which varies the relative position of the cutter-axis to the "pinion"-blank axis, in substantially the same manner in which the pinion will roll on the mating "wheel" when the two are in mesh. Fig. 4 shows the preferred relation in the dimensions of a "wheel"-cutter and a "pinion"-cutter when these are intended to fashion the teeth on a "wheel" and on a mating "pinion" respectively. In this case of companion gears, the concave edge 36 of the pinion-cutter would have the same radius as the convex edge 31 of the wheel-cutter (both edges having their common center at 32, in the diagram Fig. 4). while the other, convex edge 37 of the pinion-cutter is shown as having its center at 38, on the axis $a'$ about which the pinion-cutter rotates. As before, the radius of the convex edge may be slightly larger than that of the concave edge, or both may be substantially equal; when the radii of the two edges of the same cutter are unequal, I prefer to have the radius of the convex edge 37 of the pinion-cutter equal to the radius of the concave edge 33 of the wheel-cutter, just as the edges 31 and 36 have the same radius or curvature. The distance between the two sphere-centers 32, 34 on the wheel-cutter axis (and on the wheel cut or fashioned thereby) will generally be slightly larger than the distance between the sphere-centers 32, 38 on the pinion-cutter axis $a'$.

Fig. 3 illustrates a machine for cutting pinion tooth-surfaces with the aid of a pinion-cutter having a cutting edge 36 in the nature of a concave circular arc, a second cutting edge 37 in the nature of a convex circular arc, and a transverse "bottom-cutting" edge 39 which as shown is perpendicular to the cutter axis $a'$, although it might form an oblique angle with such axis, in the same manner as set forth above relatively to the "bottom-cutting" edge 35 of the wheel-cutter. The pinion-cutter is shown as comprising a plurality of cutting tips secured to a holder 40 in the same manner as the tips 28 of the wheel-cutter are fastened to the holder 30, said holder 40 being mounted to turn in unison with a shaft 41 journaled in a stationary bearing 42, while the pinion-blank 43 is secured (detachably) to a shaft 44 mounted to turn in a bearing 45. This bearing is secured to a suitable support 46 mounted to swing or rotate about an axis $d$, forming about the same angle with the axis $d'$ of the shaft 44 and of its bearing 45 (which is also the axis of the pinion blank 43), as the axes of the finished "wheel" and "pinion" will form with each other in the meshing position. Thus, in the case of a wheel and a pinion arranged to rotate about axes intersecting at a right angle to each other, the angle between the axes $b'$ and $d$ might be a few minutes of arc less than a right angle; a slight amount of backlash may be secured in this manner. The axis $d$ may be considered as corresponding to the axis ($b$) of the wheel with which the pinion is in mesh, the pitch-cone of the blank 43 having its apex at the point where the axes $b'$ and $d$ intersect. This point, of course, would also be the apex of the pitch cone of the "wheel" with which the pinion is to mesh, if said wheel were in place. Preferably, the axis $a'$ of the pinion-cutter would pass through the axis $d$ at the apex of the so-called back cone of the wheel. In order to produce the proper rolling motion of the pinion blank 43 (which of course is held to turn in unison with the shaft 44), I may, for instance, secure to the shaft 44 a wheel 47 whose teeth mesh with those of a stationary toothed ring 48 which may form part of the frame supporting the bearing 42. The number of teeth on the wheels or toothed rings 47, 48 will be the same (or at least in the same ratio) as the number of teeth on the finished pinion and wheel respectively. In operation, the support 46 would be swung so as to carry the pinion-blank 43 past the rapidly-rotating pinion-cutter, which, owing to the fact that the blank 43 is at the same time revolved about its own axis $b'$, will produce or generate on the pinion-blank, working tooth-surfaces conjugate to the spherically-curved surfaces of the "wheel". An "indexing" device may be provided to enable the position of the cutter axis to be shifted circumferentially with respect to the axis $d$; however, such indexing device may be dispensed with if the number of teeth on 47 and 48 are "prime" to each other (for instance forty-eight and thirteen; or, as another example, forty-nine teeth on 48, and fifteen on 47). When the numbers of teeth on 47 and 48 have this "prime" relation to each other, swinging the support 46 continuously about the axis $d$, in the same direction, will bring all tooth-spaces of the pinion-blank 43 successively into operative relation to the pinion-cutter, thus effecting automatic indexing, and rendering it unnecessary to provide any separate indexing device. It will be understood that the rotation of the pinion-cutter is at a much higher rate than that of the support 46, so that the distance traveled by the support 46 during a single "stroke" or "cut" of the tool will be practically negligible.

It will be further noted that the pinion cutter as well as the wheel cutter are male tools, which is an advantage as regards grinding the tool or otherwise keeping it in condition. The wheel cutter and the pinion cutter cut the respective blanks from opposite sides, as it were. The teeth of the wheel are of course tapering toward the wheel axis, see that portion of Fig. 2 at which two adjacent tooth-spaces are illustrated with the intervening tooth. The relation of the two cutters is further brought out in Fig. 4, where the circular arc $e$ indicates a great circle of the addendum sphere of the wheel, that is, a sphere the center of which is at the apex of the back cone of said wheel, and the radius of which is equal to the slant height of the back cone plus the addendum of the wheel teeth. The bottom-cutting edges 39 of the pinion cutter are so arranged as to lie in a tangent to said great circle, the cutter axis $a'$ being therefore perpendicular to said tangent. Having decided upon the desired depth of tooth (addendum plus dedendum), a line $f$ is drawn parallel to the above-mentioned tangent, at a distance equal to said tooth-depth. This determines one of the bottom-cutting edges 35 of the wheel-cutter, together with the apex (lying on the axis $a$) of the cone swept by said edge 35 during the revolution of the wheel-cutter. It will be seen that the pinion cutter simulates the tooth of the "wheel" not only as regards the contact surfaces thereof, but also (although to a lesser degree of precision) as regards the top or addendum boundary of the contact surfaces. It will be understood that while the pinion cutter is fashioning tooth-surfaces on the pinion blank 43, the cutter axis $a'$ and the blank axis $b'$ will occupy a skew relation of the same character as explained with reference to the axes $a$ and $b$, that is to say, the (shortest) distance between said axes $a'$ and $b'$, at the time the pinion cutter is operating on the blank 43, would be approximately equal to the radii of the cutting edges 36 and 37.

When cutting or fashioning the tooth-surfaces of bevel wheels and pinions in accordance with my invention, the axis of the blank will not only be skew to that of the cutter, during the cutting operation, but oblique thereto, that is to say, the cutter axis $a$ or $a'$ will intersect obliquely any plane perpendicular to the blank axis $b$ or $b'$ respectively. My invention is also applicable to the cutting or fashioning of tooth-surfaces on spur wheels and on spur pinions designed to mesh with such spur wheels. In this case, the cutters may be of the same general character as set forth above in connection with bevel gears, but the relation of their axes to those of the blanks will of course be different, that is, the cutter axis, while skew to the blank axis, and distant therefrom by a length approximately equal to the radii of the cutter edges, will be located within a plane perpendicular to the blank axis (during the cutting operation), instead of intersecting such plane obliquely.

A machine suitable for fashioning the teeth of a spur "wheel" according to my invention is shown in Figs. 5, 6, and 7. The parts 23, 24, 25 are of the same character as in Figs. 1 and 2, and the location of the blank axis $b$ relatively thereto is the same, the blank 49 being a "spur" blank. The cutters 50 are carried by a holder 51, and each of the cutter tips has a convex edge 52, a concave edge 53, and a transverse bottom-cutting edge 54 of the same type as hereinbefore described. The cutters 50 are secured to the holder 51 by set screws 55, and together with the cutter shaft 56 journaled in a stationary bearing 57, rotate about the axis $a$ which lies in a plane perpendicular to the blank axis $b$, said plane being preferably midway between the two end faces of the blank 49, as will be clear from Figs. 5 and 7. The distance $c$ in Fig. 6 (corresponding to the distance $c$ in Fig. 2) is approximately equal to the radii of the circularly-curved cutting edges 52 and 53.

A machine suitable for fashioning the tooth surfaces of spur "pinions" in accordance with this invention is illustrated by Figs. 8 and 9. The cutters 58 are shown secured to a holder 59 and provided with convex and concave cutting edges 60 and 61 respectively, and with transverse bottom-cutting edges 62. Set screws 63 fasten the cutters to the holder 59, the latter being held to rotate with the cutter shaft 64 journaled in a stationary bearing 65, to rotate about the axis $a'$. The cutter axis $a'$ and the blank axis $b'$, at the time of the cutting engagement of the tool with the blank, occupy the same relation to each other, substantially, as the axes $a$ and $b$ of Figs. 5, 6, and 7, and the (shortest) distance between said axes $a'$ and $b'$, which distance is indicated at $c'$ in Fig. 8, is approximately equal to the radii of the cutter edges 60 and 61. The spur pinion blank 66 is held to rotate about the axis $b'$ in unison with a pinion 67 in mesh with a wheel 68 which is stationary, at least during the cutting operation. During the latter, the pinion 67 is caused to roll on the wheel 68, as by mounting said pinion 67 and the blank 66 on a shaft 69 journaled in a bearing 70, and by connecting said bearing rigidly with a rod 71 to which a motion substantially circumferential with respect to the wheel 68, may be imparted by any suitable mechanism (not shown). The axis $b'$ is to move in a path of circular curvature centered on the axis $g$ of the wheel 68; in order to guide the shaft 69 along such a path, I may, for instance, extend said shaft through two shoes or slides 72 movable along arcuate slideways 73 having their centers on the axis $g$ and formed in stationary guide members 74. The pinion 67 has the same diameter as the blank 66, and the same number of teeth as are to be cut in the blank; the wheel 68 is of the same diameter and the same number of teeth as the "wheel" with which the pinion cut from the blank 66 is to mesh. By moving the rod 71 and the bearing 70 slowly toward the left or the right, the blank 66 will be caused to roll slowly on an imaginary spur gear of the same diameter as the wheel 68, and such motion of the blank will bring it into and out of engagement with the cutter which is rotating rapidly about the axis $a'$. Of course, the blank should not be rolled far enough to bring it to the second intersection of the cutter path with the blank path; that is, in Figs. 8 and 9, the cutter will engage the blank only on that portion of the cutter path which lies to the right of the cutter axis $a'$. After the two surfaces at the sides of the same tooth-space have been cut or fashioned in this way (together with the bottom-surface fashioned by the edge 62), indexing of the blank relatively to the cutter path will be required to cut or fashion another pair of adjoining tooth-surfaces. This indexing might be obtained, for instance, by turning the blank 66 to a new position relatively to the wheel or pinion 67, and locking the blank to the shaft 69 in such new position; or, instead of this, the wheel 68 might be turned on its axis $g$, to a proper new position ("indexed") by a suitable indexing device, such as indicated at 23.

In all of the constructions illustrated, whether for cutting the "wheel" teeth, or the conjugate teeth on the "pinion", I have shown those cutter portions which lie in the rear of the cutting edges, as "backed off", or situated interiorly of the annular body swept out by the cutter, so that said portions will not impede the cutting action; see Figs. 1, 3, 5, and 8.

Various modifications may be made without departing from the nature of my invention as set forth in the appended claims.

I claim as my invention:

1. A machine for cutting spherically-curved surfaces on gear teeth, comprising a support for the blank, a cutter-bearing whose axis is in skew relation to the axis of the blank, a cutter mounted to turn about the axis of said bearing and having a cutting edge curved according to the arc of a circle whose center is on the axis of the bearing, and means for effecting relative indexing of the blank and cutter-bearing.

2. A machine for cutting on gear teeth, curved surfaces conjugate to spherically-curved surfaces on a mating gear, said machine comprising a blank-carrier, a cutter-carrier, a cutter mounted to turn on the last-named carrier about an axis skew with respect to the axis of the blank, and provided with a cutting edge curved according to the arc of a circle centered on the cutter axis, and means for effecting a relative rolling motion of the blank and cutter-carrier, corresponding to the motion of the gear produced from said blank, relatively to the gear meshing therewith.

3. A machine for cutting curved bevel-gear tooth-surfaces of a shape conjugate to spherically-curved surfaces on a mating bevel gear, said machine comprising a blank-carrier, a cutter-support, a cutter mounted to turn on said support about an axis passing through the apex of the back-bone corresponding to said mating gear, if positioned in mating relation to said blank, said cutter having a cutting edge curved according to the arc of a circle centered on the cutter axis, and means for effecting a relative rolling motion of the blank and the cutter-support, corresponding to the motion of the gear produced from said blank, relatively to the mating gear meshing therewith.

4. A machine for cutting spherically-curved surfaces on the teeth of bevel gears, comprising a support for the blank, a cutter-bearing whose axis is in skew and oblique relation to the axis of the blank, a cutter mounted to turn about the axis of said bearing and having a cutting edge curved according to the arc of a circle centered on the axis of the bearing, and means for effecting relative indexing of the blank and cutter-bearing.

5. A machine for cutting curved bevel-gear tooth-faces of a shape conjugate to spherically-curved surfaces on a mating bevel gear, said machine comprising a blank-carrier, a cutter-support, a cutter mounted to turn on said support about an axis in skew and oblique relation to the axis of the blank at the time of operative engagement of the cutter with such blank, said cutter having a cutting edge curved according to the arc of a circle centered on the cutter axis, and means for effecting relative rolling motion of the blank and the cutter-support, corresponding to the motion of the gear produced from said blank, relatively to the mating gear meshing therewith.

6. A machine for cutting spherically-curved surfaces on the teeth of spur wheels, comprising a support for the blank, a cutter bearing whose axis is skew to the axis of the blank and lies in a plane perpendicular to said blank axis, a cutter mounted to turn about the axis of said bearing and having a cutting edge curved according to the arc of a circle centered on the axis of the bearing, and means for effecting relative indexing of the blank and cutter-bearing.

7. A machine for cutting curved surfaces on gear teeth, comprising a support for the blank, a cutter bearing whose axis is skew to the axis of the blank, and a cutter mounted to turn about the axis of said bearing and having a cutting edge curved according to the arc of a circle centered upon the axis of the bearing, the radius of said arc being approximately equal to the shortest distance between the axis of the blank and the axis of the cutter turning in engagement with blank.

8. A machine for cutting curved surfaces on gear teeth, comprising a blank-carrier, a cutter-support, and a cutter mounted to turn in engagement with the blank about an axis skew to the axis of the blank, said cutter having a cutting edge whose center of curvature is upon the axis of the cutter and whose radius of curvature is approximately equal to the shortest distance between the axis of the blank and the axis of the cutter turning in engagement with said blank.

In testimony whereof I have signed this specification.

HARVEY D. WILLIAMS.